United States Patent Office 2,855,374
Patented Oct. 7, 1958

2,855,374

CROTONIC ACID MODIFIED POLYVINYL EMULSIONS AND PROCESS FOR PREPARING SAME

Willy O. Herrmann, Deisenhofen, near Munich, and Wolfram Haehnel and Heinz Winkler, Munich, Germany, assignors to Consortium fur elektrochemische Industrie G. m. b. H., Munich, Germany, a corporation of Germany No Drawing. Application April 28, 1955, Serial No. 504,672. In Germany January 31, 1950

Public Law 619, August 23, 1954
Patent expires January 31, 1970

10 Claims. (Cl. 260—29.6)

This invention relates, generally, to compositions of matter comprised of synthetic resinous polymers and, more specifically, it is concerned with certain novel compositions, especially liquid compositions such as emulsions, dispersions and the like, comprised of thermoplastic resinous polymers, particularly polyvinyl alcohol, polyvinyl esters, vinyl ester copolymers, polyacryl esters, and the like. The invention includes, also, methods for making these novel compositions.

It is known that certain organic chemical compounds, spontaneously at a slow rate but rapidly when catalyzed, are capable of auto-reaction to produce long-chain or linear polymers wherein the individual molecular units are linked head-to-tail to produce substances of substantial or even high molecular weight. Vinyl alcohol; vinyl halides, especially the chloride; vinyl esters, such as the acetate; mixtures of vinyl esters with other compounds capable of copolymerization therewith, such as vinyl chloride or another vinyl halide; acrylic esters, particularly methyl acrylate and methyl methacrylate; are among the compounds that are capable of this type of auto-reaction. The polymeric products obtained are thermoplastic solids, more or less resembling natural resins in their properties and capable of like uses in coating, impregnant, and adhesive compositions.

These compositions may be liquid products, such as solutions comprised of the polymeric substance dissolved in a suitable, preferably volatile, organic solvent, or they may be in the form of aqueous dispersions or emulsions of the substance, including suitable emulsifying and stabilizing agents, wherein the aqueous is the continuous or dispersing phase and the substance is the discontinuous or dispersed phase.

Compositions of this type, as heretofore known, have been found to have many short-comings and disadvantages when used as adhesives for uniting surfaces of wood, fibrous material, glass, porcelain and the like, and when used as sizing or coating compositions for application to bases of fibrous material, especially webs such as paper, textiles and the like. As adhesives, these compositions were found to produce unsatisfactory, easily fractured joints, unless the adhesive and work pieces were preheated when making the joints, and, even with preheating, faulty adherence of the bonding material to the surfaces being bonded, with resultant weakening of the joint, was commonplace.

As coating compositions, these prior-art solutions and emulsions were found to be less than satisfactory because of lack of elasticity and flexibility, in some instances amounting to brittleness, of the resinous film produced therefrom; and faulty adherence of the film to the base material. When it was attempted to improve the properties of these products, especially their flexibility, by incorporating conventional types of softening or plasticizing agents therein, it was found that the beneficial effects produced were, at best, merely transient and of short duration, due probably to migration and evaporation of the plasticizers.

As impregnants for use in bonding together masses of fibrous or other fillers or in stiffening, through impregnation followed by hardening, of fibrous or other porous bodies, these compositions were found to be unsatisfactory due to brittleness of the impregnated articles, especially after prolonged exposure to ambient temperatures above ordinary room temperatures.

One of the objects of this invention is to provide improved compositions, comprised of thermoplastic substances of the types above mentioned, especially such compositions that are in liquid form, such as aqueous, dispersions and emulsions, whereby these compositions are made wholly satisfactory for use as coating, impregnant, and adhesive, including low-temperature adhesive, compositions.

Another object of this invention is to provide improved emulsions of thermoplastic polymeric substances that are capable of being used and are preeminently suited for use as adhesives for uniting surfaces of wood, fibrous material, glass, porcelain, and the like, to produce permanently strong joints, and that may be used without necessity of preheating.

Another object of this invention is to provide improved aqueous emulsions of thermoplastic polymeric substances that are capable of being used and are preeminently suited for use as coating, sizing, or similar film-forming compositions, to be applied onto bases of fibrous material, especially webs such as paper, textiles and the like, or onto wood, glass, porcelain or the like, and that produce tough and rugged, although elastic and flexible, tenaciously adherent films on the base surfaces.

Other objects of this invention will be apparent hereinafter as the description of the invention proceeds.

In accordance with this invention, it is now found that properties of liquid aqueous emulsions containing polymeric plastics, especially polyvinyl alcohol, polyvinyl halides, polyvinyl esters, vinyl ester vinyl halide copolymers, and polyacryl esters, may be improved in a surprising manner by addition of crotonic acid to the finished products prior to use. The proportion of the additive required to produce the desired effects is dependent both upon the proportion of polymeric plastic in the product and upon its intended use, but, in general, it may be stated as being a minor proportion, merely, of the total product weight, being usually at most about 10% thereof and frequently much less, say about 3% by weight.

The addition of the crotonic acid to the liquid products may be made in any manner convenient under the circumstances. For instance, due to the water-solubility of the acid, it may be stirred with an emulsion-type product in the desired proportion until an essentially homogeneous product is obtained.

The crotonic acid additive used in accordance with the principles of this invention need not be a highly purified material: the crude, commercial grades of the substance are entirely satisfactory, being preferable to the purified material, indeed, in some instances.

By this addition of crotonic acid to thermoplastic resinous polymer emulsions, the properties of these products and their range of usefulness are profoundly and advantageously modified: the adhesive capacity and ease of application of adhesive compositions are materially increased; protective films obtainable from coating compositions are greatly improved in strength and, also, are rendered elastic, flexible, and weather-resistant; and the brittleness of impregnated products is substantially reduced. In many instances, the contrast in the properties of the unmodified prior-art products and those of the products modified in accordance with this invention is striking.

It is known, for example, to use emulsions of thermoplastic polymers as adhesives in glueing and cementing various types of surfaces. Experience indicates that satisfactory union of the surfaces to be joined cannot be achieved at temperatures below about 40° F. (about 5° C.) and, preferably, both the articles to be joined and the adhesive to be used should be preheated well above ordinary room temperatures to obtain a satisfactory union. At low temperatures, say about 0° C., the prior-art emulsions become chalky white and yield no adherent film whatever, being, indeed, too inelastic, too inflexible and too brittle for use. By addition of a small amount of crotonic acid to this emulsion, not only is it possible to obtain a flexible and elastic film but, also, this film is tenaciously adherent to the surface to which it is applied, even when applied at low temperatures, including temperatures below 0° C. The commercial and industrial importance of this improvement is clearly evident, as there is now no further need for preheating of the workpieces and adhesive in glueing and cementing operations, nor is it necessary to store the bonded products, after joining, till the adhesive has set. The new modified product is truly a cold glue.

The function of the crotonic acid additive, pursuant to this invention, in effecting a desirable modification of properties of liquid aqueous emulsion of thermoplastic resinous products presently is not fully and clearly understood. It has not been proven that the acid enters into chemical reaction with the polymers, possible with involvement of its carbon-carbon double bond, to produce cross- or other linkages and, hence, it is entirely possible that the effects are due to action of a purely physical nature. Whatever the mode of function of the crotonic acid in these modified products, it is found that the polymeric substances present in emulsions to which it has been added no longer may be recovered in their original form with their original properties: instead, new polymeric substances are obtained, possessed of new and/or different properties.

The emulsions containing these new products are different in properties, also, from emulsions made from known types of polymeric substances produced by copolymerization of vinyl acetate and crotonic acid into a resinous mass. Copolymers of this type, it will be recognized, result from provable, definite chemical reactions between the vinyl acetate and the crotonic acid to yield the resinous copolymer, which, thereafter, may be used as a component of emulsions; whereas, according to this invention, the polymerizable substance already is polymerized and that polymer product is emulsified before the crotonic acid additive is added to the otherwise finished product.

The principles of this invention find particularly satisfactory application in modification of aqueous emulsions of thermoplastic resinous polymers, especially linear polymers such as polyvinyl alcohol, polyvinyl esters, polyvinyl ester copolymers, and polyacryl esters, such as are used as glues or cements for uniting surfaces formed of wood or other fibrous material, glass, porcelain and the like; and such as are used for sizing of leather, textiles, and other fibrous webs. It will be understood that emulsions intended for use as adhesives and emulsions intended for other uses are basically substantially the same, differing chiefly in presence or absence of substances other than the resinous material and the liquid vehicle, for instance, pigments; and in the proportion of resinous material in the product, the adhesives having the highest resinous material content (usually about 40% by weight but permissibly 25% to 50%), the coating compositions, an intermediate content (usually about 15% by weight but permissibly 10% to 20%), and the sizing compositions, the least content of resinous polymeric material (about 8% to 10%). In adhesive compositions according to the present invention, such as polyvinyl acetate emulsions to which crotonic acid has been added, the adhesion of the film obtained from the composition to the base on which it is applied is markedly enhanced and the union produced by use of these compositions is much stronger than may be produced by use of prior-art types of adhesive. This marked improvement in adherence resulting from practice of this invention is of importance, also, in applications such as coating of paper, textiles, and other fibrous webs, but, in these applications, even more important is the improvement in strength, flexibility, elasticity and resistance to moisture and weathering. In impregnating compositions, the chief criteria of improvement are the increase in flexibility, elasticity and toughness of the impregnated product, compared with products impregnated with unmodified prior-art types of emulsions, although the other properties above mentioned are advantageous in these applications, too.

The proportion of crotonic acid additive required in resinous plastic emulsions, specifically, in polyvinyl acetate emulsions, pursuant to this invention, to effect improvement in the properties thereof lies within the range of about 2% by weight, based on total product weight, minimum to a maximum of about 10% by weight. Optimum improvement usually is attained by use of proportions approximating 3% by weight of additive, based on total weight, subject to variations in reasonable degree dependent upon variations in the content of resinous polymer in the specific product in issue.

The changes in adhesive capacity of representative adhesive compositions resulting from modification of typical commercially available adhesives by addition of crotonic acid thereto in accordance with this invention may be illustrated readily by comparative data obtained in strength tests of joints made with the conventional and with the modified adhesives, in these instances, polyvinyl acetate aqueous emulsions containing about 45%±5% polymer. In each of these tests, a pair of substantially identical and uniform pieces of lumber were caused to adhere by application of a single coating of the adhesive composition, followed by clamping of the pieces until the adhesive had had an opportunity to set or harden. Thereafter, one of the joined pieces of each pair was mounted rigidly in a suitable support so that the other piece extended horizontally outward as an arm and, at a position on the other piece such as to provide a torque force tending to rupture the joint acting through an effective lever of about 140 millimeters, a suitable weight-supporting means was mounted. Force was applied to cause joint rupture by systematically increasing the weight carried by the weight supporting means and the load required for rupture was noted. For effective comparison purposes, the experimental data obtained concerning the various tests were translated, by calculation, into weight, expressed in units of kilograms, required for rupture of a single square centimeter of joint area. All tests were performed at ordinary room temperatures (20° C. to 30° C.).

TABLE 1

*Forces required for rupture of joints[1] produced by ordinary and by modified ordinary types of polyvinyl acetate emulsion adhesives*

| Percent of Additive | Kg./cm.² | Film Characteristics |
| --- | --- | --- |
| 0 | 1.0 | Glassy, hard, brittle. |
| 1 | 2.6 | Glassy, hard, somewhat elastic. |
| 2 | 2.0 | Glassy, hard, somewhat more elastic. |
| 3 | 3.4 | Glassy, elastic. |
| 5 | 3.5 | Glassy, very elastic. |
| 10 | 2.6 | Glassy, soft. |

[1] The joint of each of these test samples was made at ordinary room temperature and the samples, after application of the adhesive, were allowed to set in clamps for a period of about 16 hours. Under like test conditions, it was found that joints produced at about 22° C. by use of a 50% polyvinyl acetate aqueous emulsion, wherein the resinous plastic component is in a state of abnormally fine subdivision and yielded a glassy, hard and brittle film at the joint, ruptured at a force of 1.3 kilograms per square centimeter, whereas modification of this emulsion by addition thereto of 3% by weight of crotonic acid resulted in the formation of a glassy, elastic, flexible film at the joint which ruptured only when the applied force reached 3.2 kilograms per square centimeter.

The remarkable improvement in strength of low-temperature adhesions produced by modification of ordinary polyvinyl acetate aqueous emulsion adhesives will be evident from the following data, obtained by preparing and testing samples in the manner above described except that the test sample joints, instead of being made at ordinary room temperatures as hereinabove, were made at the temperatures indicated:

TABLE 2

*Forces required for rupture of low-temperature joints produced by ordinary and by modified ordinary types of polyvinyl acetate emulsion adhesives*

| Percent of Additive | Joint Formation Temperature (° C.) | Kg./cm.² | Film Characteristics |
| --- | --- | --- | --- |
| 0 | −2 to −4 | 0.9 | Chalky white. |
| 1 | −1.5 to −2 | 1.5 | Do. |
| 2 | −1.5 to 2 | 1.5 | Chalky to glassy. |
| 3 | −1 to 6 | 1.8 | Glassy, elastic. |
| 5 | 0 to 1 | 3.1 | Glassy, soft. |
| 10 | −1.5 to −4 | 2.0 | Glassy white, soft, incompletely dried. |

In like manner, replacing the ordinary polyvinyl acetate aqueous emulsion adhesive used in the foregoing tests with a 50% polyvinyl acetate aqueous emulsion adhesive wherein the resinous plastic component is in a state of abnormally fine subdivision, it was found that no joint could be made at −0.5° C. to +1° C. as the emulsion merely produced a non-adherent, chalky white deposit, whereas, when the emulsion was modified by the addition thereto of 3% crotonic acid, the joint readily could be made and it ruptured under the test conditions only after application of a force of 1.3 kilograms per square centimeter of joint area, the film in this instance being glassy, elastic and tenaciously adherent to the surfaces of the sample workpieces.

Thermoplastic resinous polymer aqueous emulsions, when modified by addition of crotonic acid thereto in accordance with this invention, provide coating compositions that yield tenaciously adherent, hard albeit substantially flexible and elastic protective coatings having a degree of resistance to the deleterious effects of moisture not possessed by coatings obtained from compositions not thus modified. This improvement in properties is especially important in such products as lacquers, paints and the like, where resistance of the coating to atmospheric moisture and other weathering conditions, including immersion in water or aqueous mixtures, is a major factor affecting product evaluation. The remarkable modification of these properties of a typical coating composition of the type mentioned, resulting from addition of crotonic acid to the composition, may be demonstrated readily as follows: An aqueous emulsion comprising 50% by weight polyvinyl acetate and containing polyvinyl alcohol as the emulsifying agent, is divided into two parts and one part is modified by addition thereto of 3% by weight of crotonic acid, which is mixed homogeneously into the emulsion. Test samples of the unmodified and the modified emulsions are rapidly evaporated by heating under vacuo in shallow pans and the cooled melt of resinous polymeric material obtained in each instance, still retaining its solubility in alcohol, is examined. It is found that the product obtained from the modified emulsion resembles shellac in color, fracture, hardness and thermoplasticity, whereas the product obtained from the unmodified emulsion, relatively, is much more brittle, inelastic and thermoplastic. Test samples of the modified and the unmodified emulsions, when applied to glass slips and dried to form residual films, may be immersed in water for about 24 hours, then examined to determine effects of this treatment. It is found that the film produced by the modified emulsion remains tenaciously adherent to the glass surface, in contrast to the film produced by the unmodified emulsion, which readily peels off the glass.

It is remarkable that the crotonic acid in the resinous polymeric products according to this invention appears to function as a plasticizer and produce, to an enhanced degree, the beneficial effects characteristic of plasticizing agents, without producing undesirable effects commonly incidental to use of conventional plasticizers, such as sweating, evaporation and migration of the plasticizer with the resultant decreases in the flexibility and elasticity of the polymeric product. The absence of these disadvantages may be due, in part at least, to linkages uniting the crotonic acid to the molecular structure of the polymers, thereby hindering evaporation or migration.

Thermoplastic resinous polymer aqueous emulsions, modified and improved by addition of crotonic acid thereto pursuant to this invention, are especially suited to use as stiffening agents in treatment of both foraminous and imperforate or continuous fibrous webs, such as paper, textiles and other woven or matted fibrous materials, and the like. By treating such materials with the emulsions or solutions, either by coating or by impregnation, then drying or evaporating the solvent vehicle, stiffening of the materials occurs to a desirable degree while elasticity is not sacrificed but, instead, enhanced. The treated products are especially adapted to ornamentation or shaping by hot die stamping or pressing and, when thus deformed, they permanently retain that shape; they may be cut longitudinally into ribbons; wound and folded into tubes and other hollow forms; shaped into rods or otherwise formed into articles of substantially any desired form or shape. The fabrication of these products, using plastics modified according to this invention, is facilitated by the elasticity and the flexibility of the modified polymers, their freedom from brittleness, their excellent thermoplastic properties and their ability to become tenaciously self-adherent when merely heated at suitable temperatures.

In particular, these modified resinous compositions may be used in single-surface coating of paper, textiles or the like where, in contradistinction to those methods for the finishing of such materials wherein the composition is caused to permeate and impregnate interior parts, merely a film-like coating, localized on and adherent to the surface of the material, is provided. The products made in this manner may be shaped or joined together by hot-pressing, die-pressing using heated dies, or otherwise worked up in the manner above described and with advantages incident thereto which have been mentioned. In products of this type, it is especially important that the coating film be strongly adherent to the fibrous base, a property possessed to an enhanced degree by the products embodying the principle of this invention.

As has been mentioned, the principles of this invention are not limited in their application merely to modification of polyvinyl acetate aqueous emulsions, but, instead, they may be applied with advantage to the modification and improvement of other thermoplastic resinous products, notably aqueous emulsions of polyacryl ester, polyvinyl halides, vinyl ester vinyl halide copolymers and the like. For instance, addition of crotonic acid to polyacryl ester emulsions of the type marketed under the trade-name "Plextol Bs" results in an improvement, i. e., an increase, of the cold flow of films obtained from the composition. Further, by the addition of crotonic acid to a coating composition comprised of an emulsified copolymerizate of vinyl chloride (60% by weight) and vinyl acetate (40% by weight) of the type marketed under the trade-name "Lutophan 250D," the film obtainable from the emulsion is found to retain its pliability better at higher temperatures than does a film obtainable from the emulsion when not thus modified.

To facilitate a fuller and more complete understanding of the subject matter of this invention, certain specific examples follow, provided for purposes of illustration, merely, and not to be construed as imposing limitations on the scope of the invention as defined in and by the claims.

EXAMPLE 1

A batch of ordinary commercial grade polyvinyl acetate aqueous emulsion of the type commonly employed as an adhesive is weighed, placed in a suitable vessel provided with means for stirring and mixing of the vessel's contents, and ordinary technical grade granular or powdered crotonic acid is added, with stirring to facilitate solution and formation of a homogeneous mixture, in an amount by weight equal to 3% of the weight of the emulsion used. The product so obtained is an aqueous emulsion, the resinous material being the dispersed phase and the aqueous component of the emulsion being the continuous or dispersing phase. To the senses, the product obtained in this manner is indistinguishable from the emulsion used as the starting material, but the modified emulsion, in contrast, may be used as an adhesive to be applied at temperatures materially lower than ordinary room temperature and without heating of the objects to be adhered, yielding a tenaciously adherent, strong film at the joint interface.

EXAMPLE 2

The operations described in Example 1 are repeated with the sole exception that the ordinary commercial grade polyvinyl acetate aqueous emulsion is replaced by an aqueous emulsion comprising about 50% by weight of polyvinyl acetate in a state of extremely fine subdivision, and polyvinyl alcohol is present as an emulsifier. The emulsion, after modification by addition of crotonic acid thereto in the proportion indicated, is a highly satisfactory adhesive for use in uniting articles of wood, porcelain, glass, paper or other forms of fibrous materials, and the like. It may be applied, without preheating of the pieces to be joined, at ordinary room temperatures or, if so desired or required, at lower temperatures, say about 0° C., yielding in each instance, a strong, adherent film at the interface where the surfaces of the articles are united.

Having thus described the subject matter of this invention, what it is desired to secure by Letters Patent of the United States is:

1. A crotonic acid modified aqueous emulsion comprising an aqueous emulsion of a polymeric compound selected from the group consisting of polyvinyl acetate, polyvinyl chloride and vinyl acetate-vinyl chloride copolymers and 2 percent to about 10 percent by weight of the total emulsion of free crotonic acid.

2. A crotonic acid modified aqueous emulsion comprising an aqueous emulsion of polyvinyl acetate and about 2 percent to about 10 percent by weight of the total emulsion of free crotonic acid.

3. Composition in accordance with claim 2 wherein the aqueous emulsion contains about 3 percent by weight of the total emulsion of free crotonic acid.

4. A crotonic acid modified aqueous emulsion comprising an aqueous emulsion of polyvinyl chloride and about 2 percent to about 10 percent by weight of the total emulsion of free crotonic acid.

5. Composition in accordance with claim 4 wherein the aqueous emulsion contains about 3 percent by weight of the total emulsion of free crotonic acid.

6. A crotonic acid modified aqueous emulsion comprising an aqueous emulsion of a vinyl acetate-vinyl chloride copolymer and about 2 percent to about 10 percent by weight of the total emulsion of free crotonic acid.

7. Composition in accordance with claim 6 wherein the aqueous emulsion contains about 3 percent by weight of the total emulsion of free crotonic acid.

8. A low temperature adhesive composition for use on unheated surfaces at ambient temperatures of about 0° C. and producing a strong bond between surfaces to which it is applied, comprising a crotonic acid modified aqueous emulsion comprising an aqueous emulsion of a polymeric compound selected from the group consisting of polyvinyl acetate, polyvinyl chloride and vinyl acetate-vinyl chloride copolymers and about 3 percent by weight of the total emulsion of free crotonic acid.

9. Process for making adhesive compositions adapted for use on unheated surfaces at ambient temperatures of about 0° C. which comprises adding from about 2 percent to 10 percent by weight of the composition of crotonic acid to an aqueous emulsion of a polymeric compound selected from the group consisting of polyvinyl acetate, polyvinyl chloride and vinyl acetate-vinyl chloride copolymers.

10. Process for making adhesive compositions adapted for use on unheated surfaces at ambient temperatures of about 0° C. which comprises adding from about 2 percent to 10 percent by weight of the composition of crotonic acid to an aqueous emulsion of polyvinyl acetate.

References Cited in the file of this patent

Du Pont: "Elvanol" Polyvinyl Alcohols, E. I. du Pont de Nemours and Company, Electrochemicals Dept., Wilmington 98, Delaware (1947), page 25.

Gardner et al.: "American Paint and Varnish Manufacturers Association," No. 401, November 1931, pages 388–391.

Von Fischer: "Paint and Varnish Technology," Reinhold Publishing Co., 1948, (pages 1–8).